M. SHIMADA.
TIRE DEFLATOR.
APPLICATION FILED OCT. 7, 1920.
1,392,231. Patented Sept. 27, 1921.
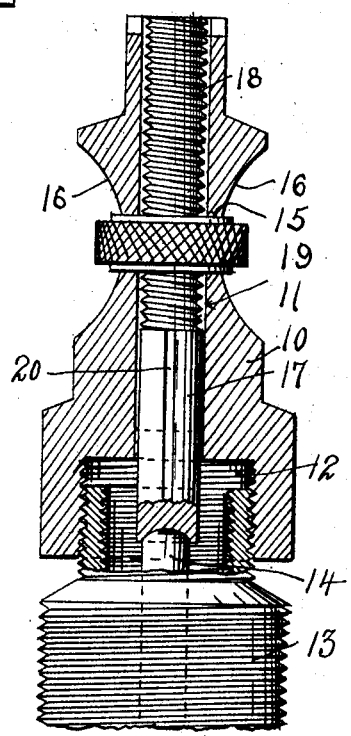
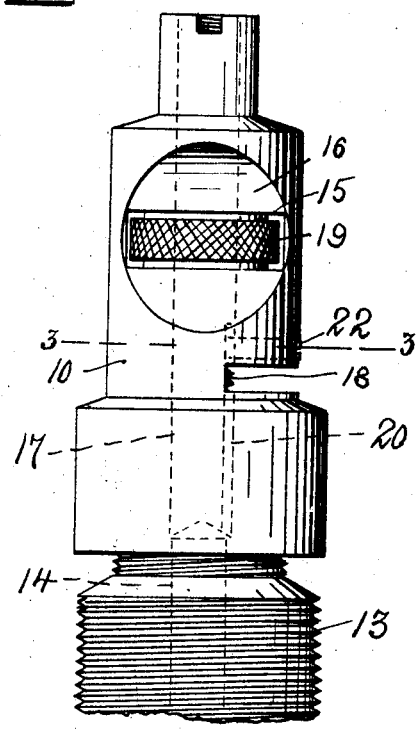
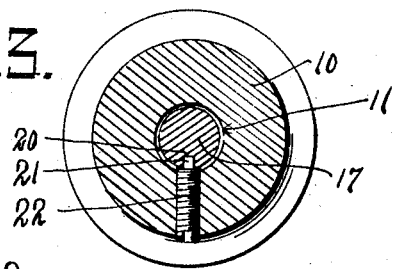
MASAO SHIMADA, INVENTOR.
BY Geo. P. Kimmel, ATTORNEY.

UNITED STATES PATENT OFFICE.

MASAO SHIMADA, OF KAHULUI, TERRITORY OF HAWAII.

TIRE-DEFLATOR.

1,392,231.  Specification of Letters Patent.  Patented Sept. 27, 1921.

Application filed October 7, 1920. Serial No. 415,350.

*To all whom it may concern:*

Be it known that I, MASAO SHIMADA, a subject of the Emperor of Japan, residing at Kahului, Maui, Territory of Hawaii, have invented certain new and useful Improvements in a Tire-Deflator, of which the following is a specification.

This invention relates to valve unseating devices, more particularly the air valves of the inner tubes of pneumatic tires, and generally denominated tire deflating implements or tools, and has for one of its objects to simplify and improve the construction of devices of this character.

With these and other objects in view, the invention consists in certain novel features of construction as hereinafter shown and described and then specifically pointed out in the claims, and in the drawings illustrative of the preferred embodiment of the invention.

Figure 1 is a longitudinal section elevation,

Fig. 2 is a side elevation,

Fig. 3 is a transverse section on the line 3—3 of Fig. 2.

The improved device comprises a body or stock 10 having a longitudinal bore 11, the bore being enlarged at one end, as at 12, and the enlargement internally threaded to engage over the externally threaded casing of the stem of the valve of the inner tube of a pneumatic tire, a portion of the casing being represented at 13, and the outer end of the stem at 14.

The body 10 is provided with a transverse opening 15 with the body cut away adjacent to the opening as represented at 16.

Disposed within the bore 15 is a rod or pin 17 having a countersunk lower end to engage over the outer end or tip of the stem 14, and with an externally threaded portion 18, the threads being left handed as shown. Fitting within the opening 15 is a disk nut 19 threaded to engage the threaded portion of the rod or pin 17 and with its periphery milled or otherwise roughened, and extending for a considerable distance into the recesses or cut away portions 16.

By this arrangement it will be obvious, that the disk or ring nut can be easily rotated by the thumb or forefinger of the operator, to cause the pin or rod 17 to be moved longitudinally of the body.

The unthreaded portion of the rod 17 is provided with a slot or keyway 20 to receive the inner end 21 of a threaded pin 22, to hold the rod from rotation while permitting it to be moved longitudinally of the body by rotating the nut 19.

The rod 17—18 is smaller than the bore 11 of the body to provide for the escape of the air when the device is operated.

By this simple device a pneumatic tire can be quickly deflated by screwing the body 10 upon the stem casing 13, and then rotating the nut 19 to cause the rod 17 to engage the stem 14 and opening the valve of the inner tube, the escaping air passing between the rod 17 and the wall of the bore 11.

The preferred embodiment of the invention is disclosed in the drawings and set forth in the specification, but it will be understood that any modifications within the scope of the claim may be made in the construction without departing from the principle of the invention or sacrificing any of its advantages.

I claim:

A device of the class described comprising a body having a longitudinal bore and a transverse opening, a threaded rod movable in said bore and adapted to engage a valve stem, and a nut engaging said threaded rod and operative through said opening.

In testimony whereof I affix my signature hereto.

MASAO SHIMADA.